United States Patent
Yano (10) Patent No.: US 10,350,802 B2
(45) Date of Patent: Jul. 16, 2019

(54) INJECTION DEVICE

(71) Applicant: FANUC CORPORATION, Yamanashi (JP)

(72) Inventor: Satoshi Yano, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/914,275

(22) Filed: Mar. 7, 2018

(65) Prior Publication Data
US 2018/0257281 A1  Sep. 13, 2018

(30) Foreign Application Priority Data
Mar. 13, 2017 (JP) .................... 2017-047174

(51) Int. Cl.
*B29C 45/50* (2006.01)
*F16H 25/24* (2006.01)
(Continued)

(52) U.S. Cl.
CPC .......... *B29C 45/5008* (2013.01); *B29C 45/84* (2013.01); *F16H 25/2454* (2013.01);
(Continued)

(58) Field of Classification Search
CPC ........ B29C 45/5008; B29C 2045/1784; B29C 45/84; B29C 2045/504; B29C 2045/5056; B29C 2045/5052; B29C 2045/5076; B29C 2045/5064; F16H 25/2454; F16H 2025/2062
See application file for complete search history.

(56) References Cited

U.S. PATENT DOCUMENTS 3,888,393 A * 6/1975 Drori .................... B29C 45/541
 222/229
4,540,359 A * 9/1985 Yamazaki ........... B29C 45/4005
 425/135
(Continued)

FOREIGN PATENT DOCUMENTS

DE   3937099 A1   5/1990
DE   10059307 A1  6/2002
(Continued)

OTHER PUBLICATIONS

English Abstract and Machine Translation for Japanese Publication No. 2003-011192 A, published Jan. 15, 2003, 8 pages.
(Continued)

*Primary Examiner* — Joseph S Del Sole
*Assistant Examiner* — Emmanuel S Luk
(74) *Attorney, Agent, or Firm* — Fredrikson & Byron, P.A.

(57) ABSTRACT

An injection device is equipped with a brake mechanism provided on a rotary shaft of an injection motor extending toward a screw side along an axial direction of the screw and configured to brake rotation of the rotary shaft, an injection motor connecting portion extending in a direction substantially perpendicular to the axial direction, and an injection motor supporting portion connected to the injection motor connecting portion so as to be adjustable in position relative to the injection motor connecting portion, and configured to support the injection motor and the brake mechanism.

4 Claims, 6 Drawing Sheets

(51) Int. Cl.
*B29C 45/84* (2006.01)
*F16H 25/20* (2006.01)
*B29C 45/17* (2006.01)

(52) U.S. Cl.
CPC ............ *B29C 2045/1784* (2013.01); *F16H 2025/2062* (2013.01)

(56) References Cited

U.S. PATENT DOCUMENTS

| | | | | |
|---|---|---|---|---|
| 4,601,653 A * | 7/1986 | Inaba | ............... | B29C 45/5008 366/79 |
| 5,092,753 A * | 3/1992 | Kumamura | ......... | B29C 45/5008 264/40.4 |
| 5,645,868 A * | 7/1997 | Reinhart | ............. | B29C 45/5008 425/145 |
| 5,914,139 A * | 6/1999 | Matsubayashi | ..... | B29C 45/5008 264/40.3 |
| 5,929,583 A * | 7/1999 | Catanzaro | ............... | B29C 45/84 318/565 |
| 6,354,829 B1 * | 3/2002 | Koide | ................. | B29C 45/1761 425/557 |
| 6,409,957 B1 * | 6/2002 | Hiraga | ............. | B29C 45/5008 264/328.1 |
| 2002/0132027 A1 * | 9/2002 | Maurilio | ............. | B29C 45/5008 425/574 |
| 2003/0165590 A1 * | 9/2003 | Dantlgraber | ........ | B29C 45/5008 425/145 |
| 2005/0208176 A1 * | 9/2005 | Nishimura | .......... | B29C 45/1761 425/587 |
| 2006/0093694 A1 * | 5/2006 | Malwitz | ............. | B29C 45/5008 425/145 |
| 2006/0188597 A1 * | 8/2006 | Chang | ................. | B29C 45/5008 425/149 |
| 2007/0297273 A1 * | 12/2007 | Urbanek | ............. | B29C 45/5008 366/78 |
| 2008/0233227 A1 * | 9/2008 | Onishi | .................... | B29C 45/17 425/136 |
| 2008/0268091 A1 * | 10/2008 | Dantlgraber | ...... | B29C 45/14639 425/587 |
| 2009/0297655 A1 * | 12/2009 | Schulz | ................ | B29C 45/5008 425/574 |
| 2014/0088757 A1 * | 3/2014 | Inami | .................. | B29C 45/5008 700/200 |
| 2016/0076607 A1 * | 3/2016 | Yasui | .................. | F16H 25/2454 188/69 |
| 2016/0131212 A1 * | 5/2016 | Yamasaki | ............. | F16D 65/183 188/69 |

FOREIGN PATENT DOCUMENTS

| | | |
|---|---|---|
| JP | 2000-176976 A | 6/2000 |
| JP | 2002-036282 A | 2/2002 |
| JP | 2003-011192 A | 1/2003 |
| JP | 2003-113876 A | 4/2003 |
| JP | 200754981 A | 3/2007 |
| JP | 2008137314 A | 6/2008 |
| JP | 2015147361 A | 8/2015 |
| WO | 9718938 A1 | 5/1997 |
| WO | WO-2006052592 A2 * | 5/2006 ......... B29C 45/5008 |

OTHER PUBLICATIONS

English Abstract and Machine Translation for Japanese Publication No. 2002-036282 A, published Feb. 5, 2002, 9 pages.
English Abstract and Machine Translation for Japanese Publication No. 2000-176976 A, published Jun. 27, 2000, 11 pages.
English Abstract and Machine Translation for Japanese Publication No. 2003-113876 A, published Apr. 18, 2003, 11 pages.
English Machine Translation of Decision to Grant issued by Japan Patent Office (JPO) in Japanese Application No. 2017-047174, Nov. 27, 2018, 3 pages.
Untranslated Decision to Grant issued by Japan Patent Office (JPO) in Japanese Application No. 2017-047174, Nov. 27, 2018, 3 pages.
English Machine Translation of Notification of Reasons for Refusal issued by Japan Patent Office (JPO) in Japanese Application No. 2017-047174, Oct. 16, 2018, 3 pages.
Untranslated Notification of Reasons for Refusal issued by Japan Patent Office (JPO) in Japanese Application No. 2017-047174, Oct. 16, 2018, 4 pages.
English Abstract and Machine Translation for Japanese Publication No. 2015-147361 A, published Aug. 20, 2015, 12 pgs.
English Abstract and Machine Translation for Japanese Publication No. 2008-137314 A, published Jun. 19, 2008, 8 pgs.
English Abstract and Machine Translation for Japanese Publication No. 2007-054981 A, published Mar. 8, 2007, 6 pgs.
English Abstract and Machine Translation for German Publication No. 3937099 A1, published May 10, 1990, 29 pgs.
English Abstract and Machine Translation for German Publication No. 10059307 A1, published Jun. 13, 2002, 18 pgs.

* cited by examiner

INJECTION DEVICE

CROSS-REFERENCE TO RELATED APPLICATION

This application is based upon and claims the benefit of priority from Japanese Patent Application No. 2017-047174 filed on Mar. 13, 2017, the contents of which are incorporated herein by reference.

BACKGROUND OF THE INVENTION

Field of the Invention

The present invention relates to an injection device for moving a pusher plate in an axial direction of a screw relative to a rear plate by use of an injection motor.

Description of the Related Art

Heretofore, in an injection device for an injection molding machine, when a screw is moved in the axial direction by use of a servomotor, if a safety gate opens and the servomotor is then brought into a servo-off state, the screw may be pushed back toward a rear plate by the pressure of gas generated from a resin material heated in a cylinder. As a countermeasure against this problem, there is a method for preventing the screw from being pushed back toward the rear plate by the use of an injection motor with a built-in brake.

In this method, the rotational force of a rotary shaft of the injection motor is transmitted to a ball screw or the like through a belt, and the rotational force is converted into a linear motion force and transmitted to the screw, whereby the screw is moved relative to the rear plate in the axial direction. On the other hand, when a force toward the rear plate acts on the screw due to the generation of gas, rotation of the rotary shaft is braked by the brake to thereby prevent the screw from moving toward the rear plate. Incidentally, in this method, because the injection motor and the brake are integrally constructed, it is unnecessary to adjust the relative position between the injection motor and the brake.

However, in this method, because it is impossible to use an injection motor which does not build a brake therein, it is impossible to select an injection motor suitable for the specification of the injection device. Further, when braking rotation of the rotary shaft, the brake built in the injection motor generally generates a friction torque corresponding to the torque of the injection motor, however, the brake in some cases cannot generate a sufficient torque for an external force. Further, the incorporation of the brake into the motor causes the entire length of the injection motor to become longer in the direction along the rotary shaft. Thus, where the injection motor is disposed with its rotary shaft parallel to the axial direction, a problem arises in that the entire length of the injection molding machine including the injection device becomes longer in the axial direction.

To solve such problem, Japanese Laid-Open Patent Publication No. 2015-147361 discloses that the rotation of a screw shaft in a screw feed mechanism, which is driven by the rotational force of a rotary shaft of a motor, is braked by a brake mechanism provided outside the motor.

SUMMARY OF THE INVENTION

However, in the device disclosed in Japanese Laid-Open Patent Publication No. 2015-147361, the rotational force of the rotary shaft of the motor is transmitted to the screw shaft through a belt. Thus, when the position of the motor is adjusted to apply a tension to the belt, adjustment of the position of the brake mechanism relative to the motor is also required at the same time, and hence the work for position adjustment is troublesome.

Accordingly, it is an object of the present invention to provide an injection device which is capable of easily performing the position adjustment of an injection motor and a brake mechanism while avoiding increase in size of the entire device.

In an aspect according to the present invention, there is provided an injection device including a screw inserted into a cylinder and configured to move in an axial direction and rotate about the axial direction, a pusher plate configured to support the screw rotatably and immovably in the axial direction, a rear plate configured to receive a reaction force from the pusher plate, an injection motor configured to move the pusher plate relative to the rear plate in the axial direction, and a conversion mechanism configured to convert the rotational force of the rotary shaft of the injection motor into a liner motion force in the axial direction and transmit the linear motion force to the pusher plate, wherein the injection device further includes a brake mechanism provided on the rotary shaft side of the injection motor and configured to brake the rotation of the rotary shaft, an injection motor connecting portion extending in a direction substantially perpendicular to the axial direction, and an injection motor supporting portion connected to the injection motor connecting portion so as to be adjustable in position relative to the injection motor connecting portion and configured to support the injection motor and the brake mechanism.

According to the present invention, the brake mechanism is provided on the rotary shaft of the injection motor, and the injection motor and the brake mechanism are supported through the injection motor supporting portion on the injection motor connecting portion extending in the direction substantially perpendicular to the axial direction of the screw. With this structure, it is possible to prevent the injection device from increasing in size in the axial direction. Further, by the position adjustment of the injection motor supporting portion relative to the injection motor connecting portion, the positions of the injection motor and the brake mechanism are integrally adjusted, and thus it becomes unnecessary to adjust the relative position between the injection motor and the brake mechanism. Consequently, it is possible to easily perform the position adjustment of the injection motor and the brake mechanism.

The above and other objects, features and advantages of the present invention will become more apparent from the following description when taken in conjunction with the accompany drawings, in which a preferred embodiment of the present invention is shown by way of an illustrative example.

DESCRIPTION OF THE PREFERRED EMBODIMENTS

An injection device according to the present invention will be described based on a preferred embodiment with reference to the accompanying drawings.

[Configuration of Injection Device]

Figure 1:
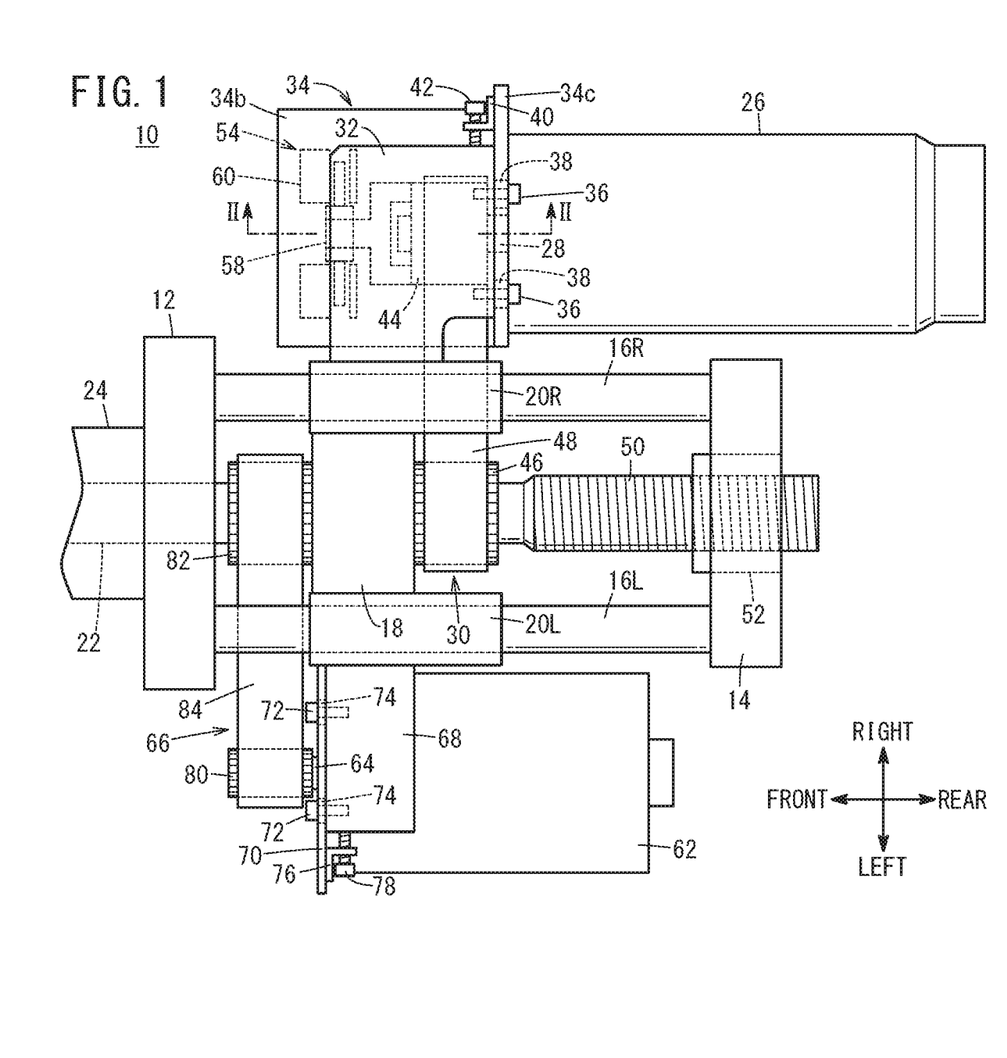
FIG. 1 is a plan view of an injection device according to an embodiment of the present invention.
Figure 2:
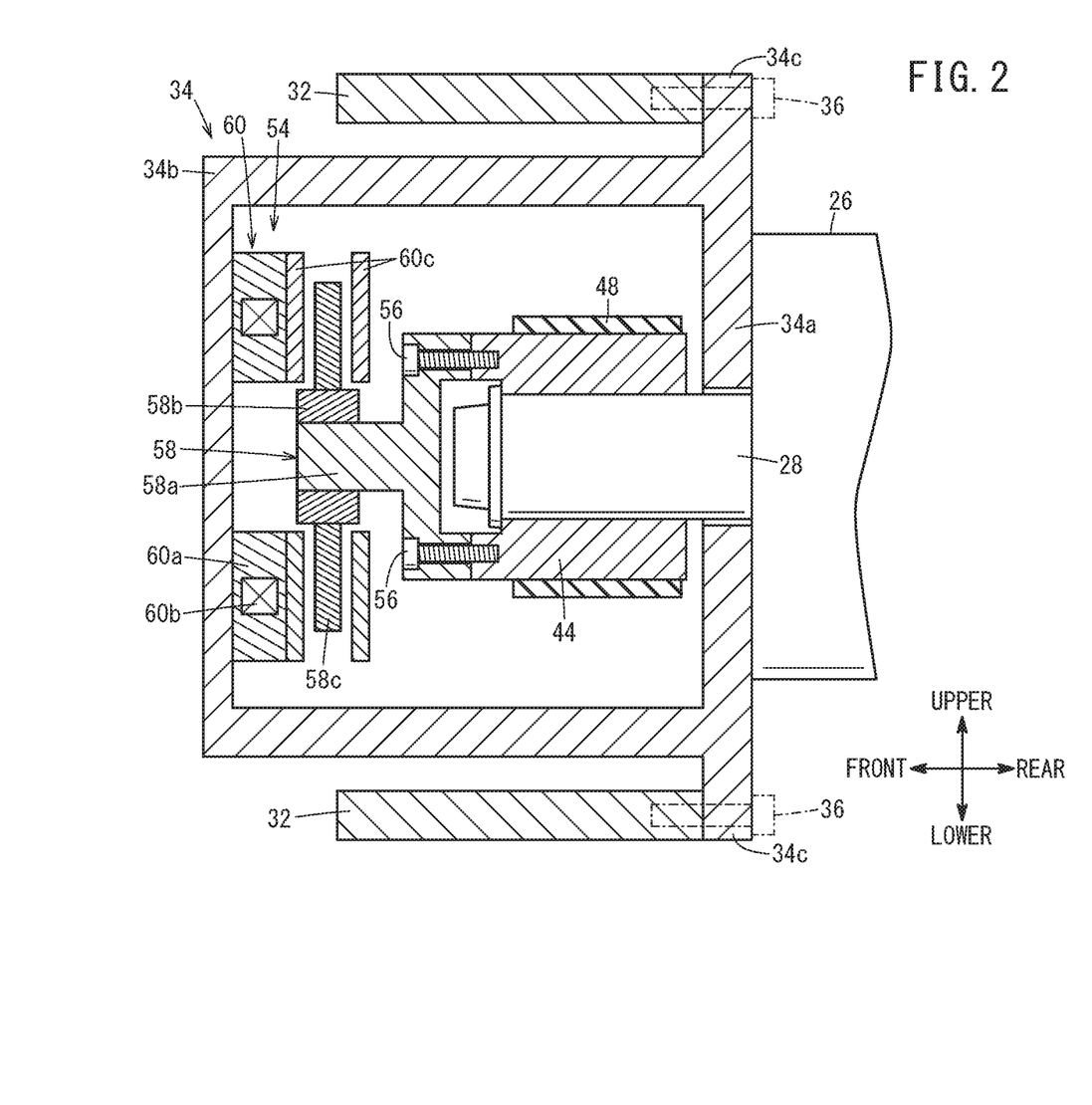
FIG. 2 is a partial sectional view of the injection device taken along line II-II in FIG. 1.

FIG. 1 is a plan view of an injection device 10 for an injection molding machine, and FIG. 2 is a partial sectional view of the injection device 10 taken along line II-II in FIG. 1. Incidentally, the directions of front-rear, right-left and upper-lower will be described in accordance with the directions indicated by the arrows in FIG. 1 and FIG. 2.

The injection device 10 has a front plate 12 provided on a front side, a rear plate 14 provided on a rear side and a plurality of tie bars 16L, 16R extending in the front-rear direction and connecting the front plate 12 to the rear plate 14. In this case, two tie bars 16L are arranged respectively at upper and lower positions on the left side of the injection device 10, while two tie bars 16R are arranged respectively at upper and lower positions on the right side of the injection device 10. A pusher plate 18 extending in a direction substantially perpendicular to the axial direction (the front-rear direction) of the plurality of tie bars 16L, 16R is provided between the front plate 12 and the rear plate 14.

The pusher plate 18 includes, at four corners thereof, sliding blocks 20L, 20R through which the tie bars 16L, 16R penetrate. That is, the two left-side tie bars 16L provided respectively on the upper and lower sides penetrate through the two sliding blocks 20L, while the two right-side tie bars 16R provided respectively on the upper and lower sides penetrate through the two sliding blocks 20R. The pusher plate 18 is movable between the front plate 12 and the rear plate 14 in the axial direction of the plurality of tie bars 16L, 16R through the plurality of sliding blocks 20L, 20R.

The pusher plate 18 supports a screw 22 rotatably and immovably in the axial direction (the front-rear direction) of the screw 22. Incidentally, the axial direction of the screw 22 and the axial direction of the plurality of tie bars 16L, 16R are substantially in parallel (the front-rear direction) with each other. For this reason, the direction of these members will be referred to as "axial direction" in the following description.

The screw 22 is inserted into a cylinder 24 such as a heat cylinder or the like, and is able to move in the axial direction and to rotate about the axial direction. The cylinder 24 is fixed to the front plate 12. On a further front side of the cylinder 24, there is provided a mold clamping device (not shown) having a mold of the injection molding machine.

The injection device 10 further has an injection motor 26 such as a servomotor or the like and a conversion mechanism 30 which moves the pusher plate 18 in the axial direction (the front-rear direction) by converting the rotational force of a rotary shaft 28 of the injection motor 26 into a linear motion force in the axial direction and transmitting the linear motion force to the pusher plate 18.

The injection motor 26 is disposed on the right side of the pusher plate 18 through two injection motor connecting portions 32 and an injection motor supporting portion 34. The injection motor connecting portions 32 extend from the two respective right-side sliding blocks 20R provided on the upper and lower sides to the right in a direction substantially perpendicular to the axial direction. The injection motor supporting portion 34 is connected to the two upper and lower injection motor connecting portions 32. The two injection motor connecting portions 32 provided on the upper and lower sides are members each taking an L-shape as viewed in a plan view of FIG. 1, and the injection motor supporting portion 34 is attached to the rear portions of the injection motor connecting portions 32 by screw members 36 such as screws or the like.

The injection motor supporting portion 34 is attached to the rotary shaft 28 side of the injection motor 26 and takes a box shape provided with an interior space accommodating the rotary shaft 28. That is, a main body portion of the injection motor 26 is attached to the injection motor supporting portion 34 on the rear plate 14 side in the axial direction, so that the rotary shaft 28 is inserted into the interior space on a front side of the injection motor supporting portion 34.

As shown in FIG. 1 and FIG. 2, the injection motor supporting portion 34 comprises a plate-shaped motor mounting portion 34a extending in a direction substantially perpendicular to the axial direction and having a back surface on which the main body portion of the injection motor 26 is mounted, and through which the rotary shaft 28 penetrates in the axial direction. The injection motor supporting portion 34 further comprises a box-shaped accommodation portion 34b provided on the front side of the motor mounting portion 34a and accommodating therein the rotary shaft 28 penetrating the motor mounting portion 34a and protruding forward, and a flange portion 34c protruding from the motor mounting portion 34a in a direction substantially perpendicular to the axial direction. With this configuration, the injection motor 26 is disposed in the front-rear direction along the axial direction.

Further, the flange portion 34c is attached by the plural screw members 36 to the upper and lower-side injection motor connecting portions 32, and thus, the injection motor supporting portion 34 is connected to the injection motor connecting portions 32. That is, the upper side and lower side of the flange portion 34c are attached respectively to the upper and lower injection motor connecting portions 32 by the two screw members 36 on each side, so that the injection motor supporting portion 34 is connected to the injection motor connecting portions 32. Incidentally, as shown in FIG. 1, the flange portion 34c has, at positions where the screw members 36 are mounted, elongate holes 38 each extending in the right-left direction. Further, on the right side of a front surface of the flange portion 34c, two screw support members 40 each taking a substantially L-shape are provided respectively on the upper and lower sides correspondingly to the upper and lower injection motor connecting portions 32. Adjusting screw members 42 such as screws, bolts or the like are screw-engaged in the right-left direction with the two respective upper and lower-side screw support members 40.

The conversion mechanism 30 comprises a drive pulley 44 non-rotatably attached on the rotary shaft 28, a driven pulley 46 supported rotatably and axially immovably by the pusher plate 18 on the rear plate 14 side of the pusher plate 18 in the axial direction, and a belt 48 wound around the drive pulley 44 and the driven pulley 46. The conversion mechanism 30 further comprises a ball screw 50 extending from the driven pulley 46 toward the rear plate 14 in the axial direction and connected to the driven pulley 46 non-rotatably and immovably in the axial direction, and a ball screw nut 52 fixed to the rear plate 14 non-rotatably and immovably in the axial direction and screw-engaged with the ball screw 50.

In this case, when the rotary shaft 28 of the injection motor 26 is rotated under the control of a controller (not shown), the rotational force is transmitted to the driven pulley 46 through the drive pulley 44 and the belt 48. Thus, the driven pulley 46 and the ball screw 50 are rotated together, whereby the rotational force is converted into the linear motion force in the axial direction.

The accommodation portion 34*b* of the injection motor supporting portion 34 further accommodates in its interior space a brake mechanism 54 which is provided on a front side of the rotary shaft 28 through the drive pulley 44. The brake mechanism 54 is made up of a rotor portion 58 connected non-rotatably to a front end portion of the drive pulley 44 by screw members 56 such as screws or the like, and a brake portion 60 for braking the rotation of the rotary shaft 28 and the drive pulley 44 connected to the rotor portion 58 by, for example, sandwiching and pinching the rotor portion 58.

The rotor portion 58 has a rotor attachment portion 58*a* attached to the front end portion of the drive pulley 44 by the screw members 56, and a disc-shaped rotor 58*c* fixed to the rotor attachment portion 58*a* through a rotor hub 58*b* which is provided at a front end portion of the rotor attachment portion 58*a*.

On the other hand, the brake portion 60 comprises an annular brake attachment portion 60*a* attached to an inner side of a front end portion of the accommodation portion 34*b*, an electromagnet 60*b* built in the brake attachment portion 60*a*, and brake pads 60*c* each made of a magnetic body for sandwiching and pinching the rotor 58*c* in the front-rear direction in response to a magnetic flux generated by energization to the electromagnet 60*b* to thereby brake the rotation of the rotary shaft 28 and the drive pulley 44. When the energization to the electromagnet 60*b* is discontinued, the brake pads 60*c* are separated from the rotor 58*c* to release the rotary shaft 28 and the drive pulley 44 from the braking state.

Although FIG. 1 and FIG. 2 show the case that the brake mechanism 54 is an electromagnetic brake, the brake mechanism 54 may be a brake of any type (a hydraulic brake, for example) as long as one can brake the rotation of the rotary shaft 28 and the drive pulley 44.

Further, the injection device 10 further has a screw rotating motor 62 such as a servomotor or the like, and a rotation transmission mechanism 66 for transmitting the rotational force of a rotary shaft 64 of the screw rotating motor 62 to the screw 22 to thereby rotate the same.

The screw rotating motor 62 is disposed on the left side of the pusher plate 18 through two screw rotating motor connection portions 68 and a screw rotating motor support portion 70. The two screw rotating motor connection portions 68 extend leftward respectively from the two left sliding blocks 20L provided on the upper and lower sides so as to be substantially perpendicular to the axial direction. The screw rotating motor support portion 70 is connected to the two screw rotating motor connection portions 68 on the upper and lower sides. The screw rotating motor support portion 70 is attached to front end portions of the two screw rotating motor connection portions 68 provided on the upper and lower sides, by screw members 72 such as screws or the like.

The screw rotating motor support portion 70 is a plate-shaped member extending in a direction substantially perpendicular to the axial direction. In this case, the screw rotating motor support portion 70 is attached by the plurality of screw members 72 to the two upper and lower-side screw rotating motor connection portions 68, whereby the screw rotating motor support portion 70 is connected to the screw rotating motor connection portions 68.

A main body portion of the screw rotating motor 62 is attached to a back surface of the screw rotating motor support portion 70, and a rotary shaft 64 thereof penetrates the screw rotating motor support portion 70 and extends forward in the axial direction. That is, the screw rotating motor 62 is arranged on the left side of the pusher plate 18 along the axial direction.

The screw rotating motor support portion 70 includes, at positions where the screw members 72 are mounted, elongate holes 74 extending in the right-left direction. Further, on the left side of the back surface of the screw rotating motor support portion 70, two screw support members 76 each having a substantially L-shape are provided respectively on upper and lower sides corresponding to the upper and lower screw rotating motor connection portions 68. Adjusting screw members 78 such as screws, bolts or the like are respectively screw-engaged in the right-left direction with the two upper and lower screw support members 76.

The rotation transmission mechanism 66 is made up of a drive pulley 80 non-rotatably attached to the rotary shaft 64, a driven pulley 82 supported by the pusher plate 18 rotatably and immovably axially on the front plate 12 side of the pusher plate 18 in the axial direction, and a belt 84 wound around the drive pulley 80 and the driven pulley 82. When the rotary shaft 64 of the screw rotating motor 62 is rotated under the control of the controller (not shown), the rotational force is transmitted to the driven pulley 82 through the drive pulley 80 and the belt 84. As a result, the driven pulley 82 and the screw 22 are rotated together.

[Operation of Injection Device]

A description will be given regarding the operation of the injection device 10 in the present embodiment constructed as described above.

Under the control of the controller (not shown), the rotary shaft 28 of the injection motor 26 is rotated, and the rotational force is transmitted to the driven pulley 46 through the drive pulley 44 and the belt 48. Thus, the driven pulley 46 and the ball screw 50 are rotated together, and the rotational force is converted into the linear motion force in the axial direction.

As described above, the ball screw nut 52 is fixed to the rear plate 14. Further, the pusher plate 18 supports the screw 22 rotatably and immovably in the axial direction and also supports the injection motor 26 through the sliding blocks 20R, the injection motor connecting portions 32 and the injection motor supporting portion 34. Further, the pusher plate 18 supports the screw rotating motor 62 through the sliding blocks 20L, the screw rotating motor connection portions 68 and the screw rotating motor support portion 70.

Accordingly, when the driven pulley 46 and the ball screw 50 are rotated together, the screw 22, the pusher plate 18, the sliding blocks 20R, the injection motor connecting portions 32, the injection motor supporting portion 34 and the injection motor 26 are moved together with the sliding blocks 20L, the screw rotating motor connection portions 68, the screw rotating motor support portion 70 and the screw rotating motor 62 in the axial direction relative to the rear plate 14. At this time, the rear plate 14 receives a reaction force from the pusher plate 18.

Further, when the rotary shaft 64 of the screw rotating motor 62 is rotated under the control of the controller (not shown), the rotational force is transmitted to the driven pulley 82 through the drive pulley 80 and the belt 84. Thus, the driven pulley 82 and the screw 22 are rotated together.

Next, a description will be given regarding a position adjusting method for the injection motor supporting portion 34 (and the injection motor 26 and the brake mechanism 54 supported by the injection motor supporting portion 34) relative to the injection motor connecting portions 32.

When each of the adjusting screw members 42 on the upper and lower sides is rotated, the protruding amount (protruding length) of the adjusting screw member 42 from the screw support member 40 is changed depending on the rotation of the adjusting screw members 42. At the time of connecting the injection motor supporting portion 34 to the injection motor connecting portions 32, the screw members 36 on the upper and lower sides are inserted into the respective elongate holes 38 and are temporarily tightened to respective screw holes formed in the injection motor connecting portions 32. When the two adjusting screw members 42 are rotated (in a clockwise direction) in the state that the temporary tightening has been done (i.e., in the temporal fastening state), the protruding amounts of the adjusting screw members 42 from the screw support members 40 are made to be longer (that is, the adjusting screw members 42 are moved leftward). As a result, the injection motor supporting portion 34 is moved rightward relative to the two injection motor connecting portions 32.

On the contrary, when each of the two adjusting screw members 42 is reversely rotated (in a counterclockwise direction), the protruding amount of the adjusting screw member 42 from the screw support member 40 is made to be shorter (i.e., the adjusting screw members 42 are moved rightward relative to the screw support members 40). As a result, the injection motor supporting portion 34 is moved leftward relative to the injection motor connecting portions 32 on the upper and lower sides. By rotating the adjusting screw members 42 in this way, it is possible to adjust in the right-left direction the position of the injection motor supporting portion 34 relative to the injection motor connecting portions 32 (i.e., the positions of the injection motor 26 and the brake mechanism 54).

Next, a description will be given regarding a position adjusting method for the screw rotating motor support portion 70 (and the screw rotating motor 62 supported by the screw rotating motor support portion 70) relative to the screw rotating motor connection portions 68.

When each of the adjusting screw members 78 on the upper and lower sides is rotated, the protruding amount (protruding length) of the adjusting screw member 78 protruding rightward from the screw support member 76 is changed depending on the rotation of the adjusting screw member 78. At the time of connecting the screw rotating motor support portion 70 to the screw rotating motor connection portions 68, the upper and lower screw members 72 are inserted respectively into the elongate holes 74 and are temporarily tightened to respective screw holes formed in the screw rotating motor connection portions 68. When the two adjusting screw members 78 are rotated (in a clockwise direction) in the state that the temporary tightening has been done (i.e., in the temporal tightening state), the protruding amounts of the adjusting screw members 78 from the screw support members 76 are made to be longer (i.e., the adjusting screw members 78 are moved rightward). As a result, the screw rotating motor support portion 70 is moved leftward relative to the two screw rotating motor connection portions 68.

On the contrary, when the two adjusting screw members 78 are reversely rotated (counterclockwise), the protruding amounts of the adjusting screw members 78 protruding from the screw support members 76 are made to be shorter (i.e., the adjusting screw members 78 are moved leftward relative to the screw support members 76). As a result, the screw rotating motor support portion 70 is moved rightward relative to the upper and lower-side screw rotating motor connection portions 68. By rotating the adjusting screw members 78 in this way, it is possible to adjust in the right-left direction the position of the screw rotating motor support portion 70 (i.e., the position of the screw rotating motor 62) relative to the screw rotating motor connection portions 68.

[Advantageous Effects of Injection Device]

Advantageous effects of the injection device 10 in the present embodiment constructed as described above will be described with reference also to FIG. 3.

Figure 3:
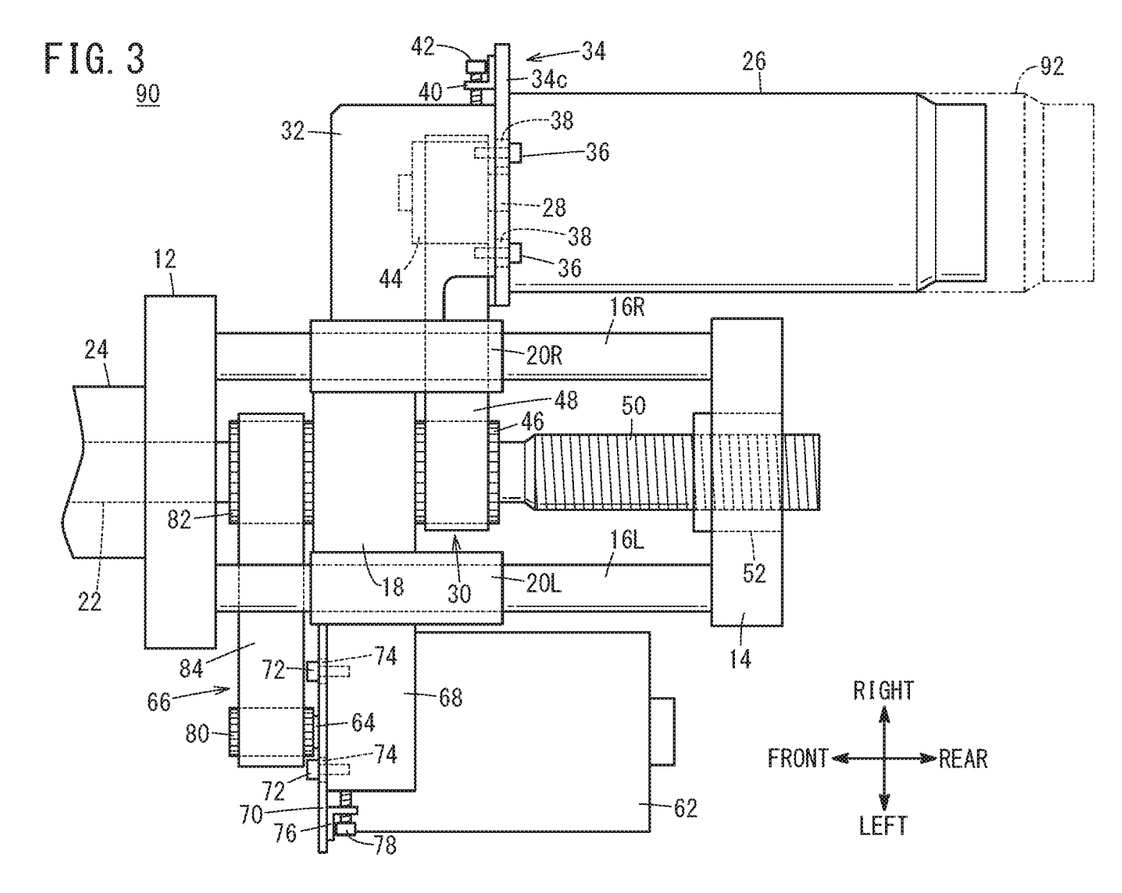
FIG. 3 is a plan view of an injection device in a comparative example.

FIG. 3 is a plan view of an injection device 90 in a comparative example. The injection device 90 differs from the injection device 10 of the present embodiment shown in FIG. 1 and FIG. 2 in that the injection device 90 is not provided with the brake mechanism 54 and the injection motor supporting portion 34 does not have the accommodation portion 34b. Incidentally, in FIG. 3, the same components as those of the injection device 10 are given the same reference numerals, and detail descriptions thereof will be omitted.

In the injection device 90 of the comparative example, when the injection motor 26 is placed into a servo-off state because of the opening of a safety gate (not shown) in an injection molding machine, the screw 22 is pushed back toward the rear plate 14 in the axial direction by the pressure of gas which is generated as a result of heating of resin material supplied to the cylinder 24 from a hopper (not shown), and the rear plate 14 receives a reaction force through the pusher plate 18 and the ball screw 50. As a countermeasure against this problem, it is conceived to attach an injection motor 92 having a built-in brake (indicated by the two-dot chain line in FIG. 3) to the injection motor supporting portion 34 in place of the injection motor 26 which does not have a built-in brake. However, the entire length of the injection motor 92 in the axial direction is increased by a length corresponding to the built-in brake, and thus, the entire length of the injection device 90 in the axial direction becomes longer. Further, because the torque of the brake built in the injection motor 92 depends on the injection motor 92, it may be the case that the torque of the brake necessary for braking rotation of the rotary shaft 28 is insufficient when the screw 22 is pushed back toward the rear plate 14 side.

In contrast to the above comparative example, in the injection device 10 of the present embodiment shown in FIG. 1 and FIG. 2, the brake mechanism 54 is provided on the rotary shaft 28 of the injection motor 26, and the injection motor 26 and the brake mechanism 54 are supported through the two injection motor connecting portions 32 extending from the pusher plate 18 in the direction substantially perpendicular to the axial direction of the screw 22 and through the injection motor supporting portion 34. Thus, it is possible to prevent the injection device 10 from increasing in size in the axial direction. Further, by the position adjustment of the injection motor supporting portion 34 relative to the injection motor connecting portions 32, the positions of the injection motor 26 and the brake mechanism 54 are integrally adjusted. Thus, it becomes unnecessary to adjust the relative position between the injection motor 26 and the brake mechanism 54. Consequently, it is possible to easily adjust the positions of the injection motor 26 and the brake mechanism 54.

Moreover, when the safety gate (not shown) opens in the injection molding machine and the injection motor 26 is then placed into a servo-off state, the brake mechanism 54 sandwiches the rotor 58c with the brake pads 60c in response to the energization of the electromagnet 60b to thereby brake the rotation of the rotary shaft 28 and the drive pulley 44. Thus, even when the rear plate 14 receives the reaction force through the pusher plate 18 and the ball screw 50 due to the pressure of the gas which is generated from the resin material heated in the cylinder 24, the brake mechanism 54 puts a brake on the rotation of the rotary shaft 28 and the drive pulley 44. Thus, the driven pulley 46 connected to the rotary shaft 28 and the drive pulley 44 through the belt 48 and the ball screw 50 are prevented from being rotated. Accordingly, it is possible to prevent the screw 22, the pusher plate 18 and the like from being moved by the pressure of the gas toward the rear plate 14 side.

Further, where the conversion mechanism 30 is provided between the pusher plate 18 and the rear plate 14, the position of the injection motor supporting portion 34 relative to the two upper and lower injection motor connecting portions 32 is adjusted by use of the screw support members 40 and the adjusting screw members 42, and thus, the positions of the injection motor 26 and the brake mechanism 54 are integrally adjusted. Accordingly, it is possible to apply a desired tension (an initial tension) to the belt 48 of the conversion mechanism 30 without changing the positional relation between the injection motor 26 and the brake mechanism 54 (i.e., without adjusting the position of the brake mechanism 54 relative to the injection motor 26).

Furthermore, because the injection motor supporting portion 34 taking a box-shape is attached to a front side of the injection motor 26 where the rotary shaft 28 extends in the axial direction, it is possible to protect the rotary shaft 28 and the brake mechanism 54 properly.

Still furthermore, in the brake mechanism 54, the rotation of the rotary shaft 28 and the drive pulley 44 is braked by the brake portion 60 sandwiching and pinching the rotor portion 58 connected non-rotatably to the rotary shaft 28 through the drive pulley 44. Consequently, it is possible to brake the rotation of the rotary shaft 28 and the drive pulley 44 with a simple structure on the front side of the rotary shaft 28 and the drive pulley 44.

[Modifications of Injection Device]

The injection device 10 of the present embodiment can be modified as follow. Although the injection motor supporting portion 34 shown in FIG. 1 and FIG. 2 is integrally formed, injection motor supporting portions 34 in first to third modifications respectively shown in FIG. 4 to FIG. 6 each comprise a plurality of members.

Figure 4:
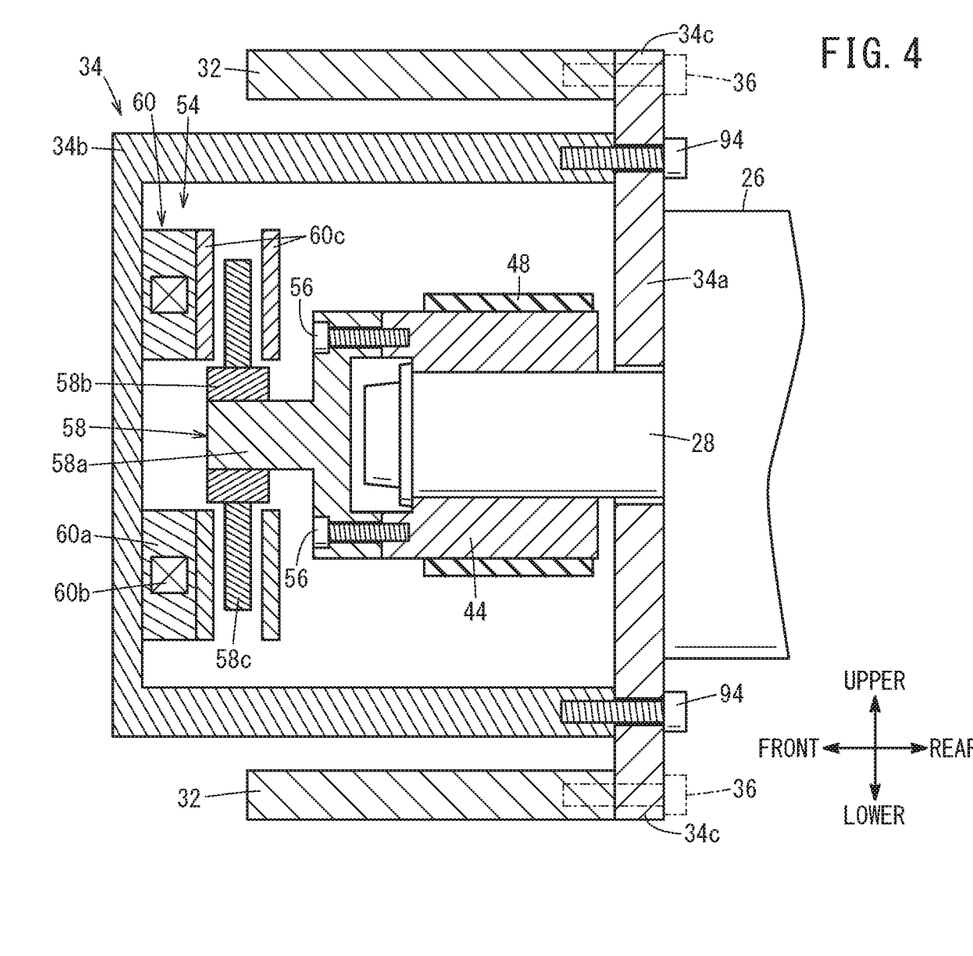
FIG. 4 is a partial sectional view showing a first modification of the injection device shown in FIG. 1.

In the first modification shown in FIG. 4, the motor mounting portion 34a and the flange portion 34c are formed as a member separated from the accommodation portion 34b, and the accommodation portion 34b having a U-shape in cross-section is attached to the flange portion 34c by screw members 94 such as screws or the like.

Figure 5:
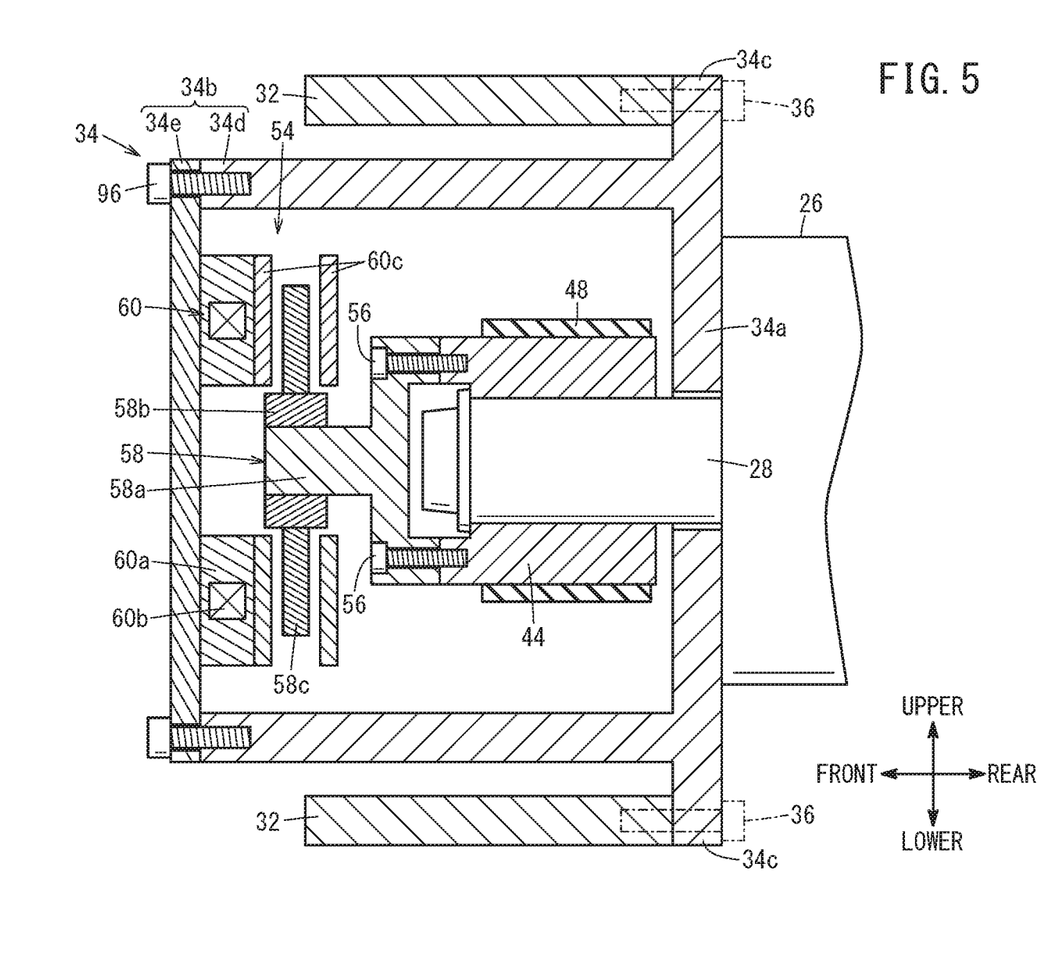
FIG. 5 is a partial sectional view showing a second modification of the injection device shown in FIG. 1.

In the second modification shown in FIG. 5, the accommodation portion 34b is composed of a tubular portion 34d opening toward the front side and a lid portion 34e covering the opening portion of the tubular portion 34d from the front side. The lid portion 34e is attached to the tubular portion 34d by screw members 96 such as screws or the like. In this case, the brake portion 60 is provided on the lid portion 34e.

Figure 6:
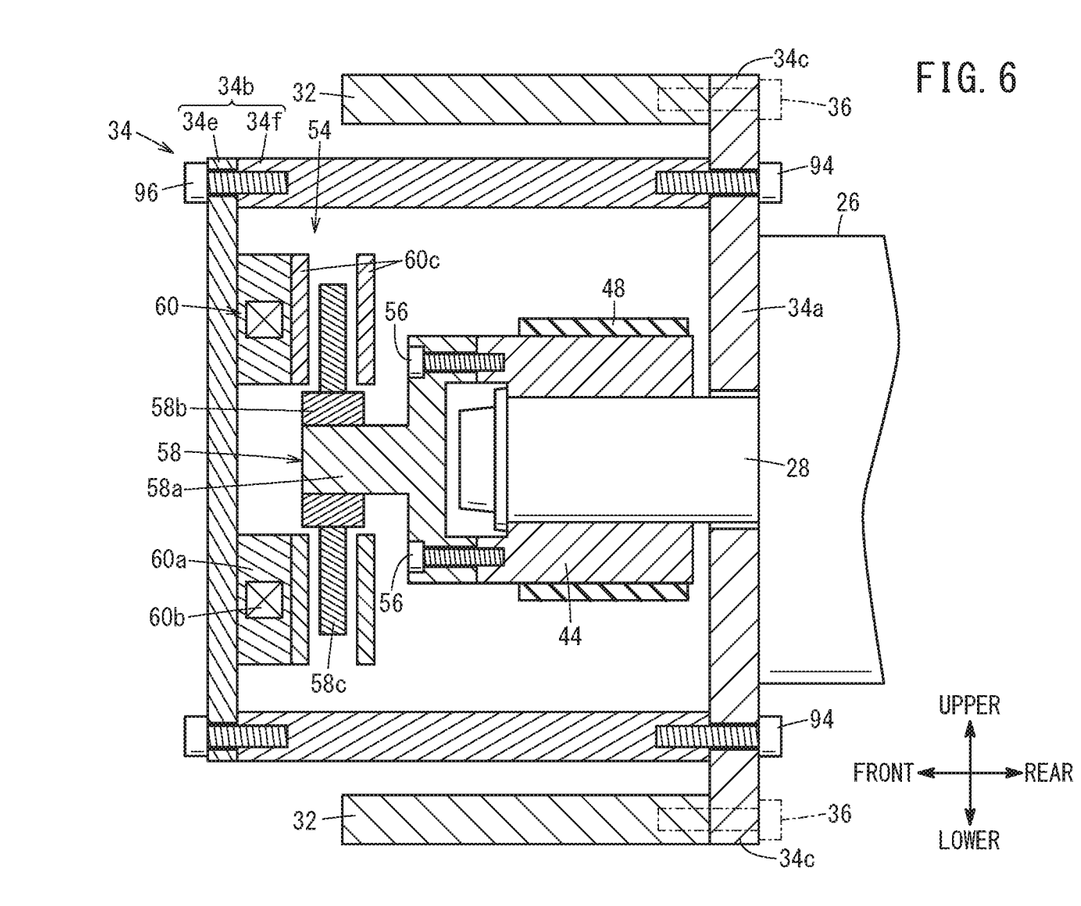
FIG. 6 is a partial sectional view showing a third modification of the injection device shown in FIG. 1.

In the third modification shown in FIG. 6, the motor mounting portion 34a and the flange portion 34c are formed as a member separated from the accommodation portion 34b. Further, the accommodation portion 34b is composed of a tubular portion 34f and a lid portion 34e covering an opening portion of the tubular portion 34f from the front side. In this case, a rear end of the tubular portion 34f is attached to the flange portion 34c by screw members 94, and the lid portion 34e is attached to the front end of the tubular portion 34f by screw members 96.

In each of the first to third modifications, although the number of components of the injection motor supporting portion 34 increases in comparison with that in the embodiment shown in FIGS. 1 and 2, the members of the injection motor supporting portion 34 are simplified in shape. Thus, such members can be easily formed. Incidentally, FIGS. 4 to 6 are presented for illustrative purposes only, and it goes without saying that any configuration can be taken as long as the injection motor supporting portion 34 is composed of a plurality of members.

[Technical Ideas Grasped from Embodiment]

Hereafter, description will be made regarding technical concepts or ideas grasped from the forgoing embodiment.

In an injection device (10) which includes a screw (22) inserted into a cylinder (24) and configured to move in an axial direction and rotate about the axial direction, a pusher plate (18) configured to support the screw (22) rotatably and immovably in the axial direction, a rear plate (14) configured to receive a reaction force from the pusher plate (18), an injection motor (26) configured to move the pusher plate (18) relative to the rear plate (14) in the axial direction, and a conversion mechanism (30) configured to convert the rotational force of the rotary shaft (28) of the injection motor (26) into a liner motion force in the axial direction and transmit the linear motion force to the pusher plate (18), the injection device (10) further includes a brake mechanism (54) provided on the rotary shaft (28) side of the injection motor (26) and configured to brake rotation of the rotary shaft (28), an injection motor connecting portion (32) extending in a direction substantially perpendicular to the axial direction, and an injection motor supporting portion (34) connected to the injection motor connecting portion (32) so as to be adjustable in position relative to the injection motor connecting portion (32), and configured to support the injection motor (26) and the brake mechanism (54).

With this configuration, the brake mechanism (54) is provided on the rotary shaft (28) of the injection motor (26), and the injection motor (26) and the brake mechanism (54) are supported through the injection motor supporting portion (34) on the injection motor connecting portion (32) extending in the direction substantially perpendicular to the axial direction of the screw (22). Thus, it is possible to prevent the injection device (10) from increasing in size in the axial direction. Further, by the position adjustment of the injection motor supporting portion (34) relative to the injection motor connecting portion (32), the positions of the injection motor (26) and the brake mechanism (54) are integrally adjusted, and thus it becomes unnecessary to adjust the relative position between the injection motor (26) and the brake mechanism (54). Consequently, it is possible to easily perform the position adjustment of the injection motor (26) and the brake mechanism (54).

In the aforementioned injection device (10), the injection motor supporting portion (34) may include a plurality of members. Thus, although the number of components of the injection motor supporting portion (34) increases, the shapes of the members of the injection motor supporting portion (34) are each simplified, so that it is possible to easily form each member.

In the aforementioned injection device (10), the injection motor supporting portion (34) may have a box shape configured to accommodate the rotary shaft (28) and the brake mechanism (54). With this configuration, it is possible to protect the rotary shaft (28) and the brake mechanism (54) properly.

In the aforementioned injection device (10), the brake mechanism (54) may include a rotor portion (58) non-rotatably connected to the rotary shaft (28) and a brake portion (60) configured to brake rotation of the rotary shaft (28) by sandwiching the rotor portion (58). With this feature, it is possible to brake rotation of the rotary shaft (28) with a simple structure on the front side of the rotary shaft (28).

While the invention has been particularly shown and described with reference to a preferred embodiment, it will be understood that variations and modifications can be effected thereto by those skilled in the art without departing from the scope of the invention as defined by the appended claims.

What is claimed is:

1. An injection device comprising:
   a screw inserted into a cylinder and configured to move in an axial direction and rotate about the axial direction;
   a pusher plate configured to support the screw rotatably and immovably in the axial direction;
   a rear plate configured to receive a reaction force from the pusher plate;
   an injection motor configured to move the pusher plate relative to the rear plate in the axial direction; and
   a conversion mechanism configured to convert a rotational force of a rotary shaft of the injection motor into a liner motion force in the axial direction and transmit the linear motion force to the pusher plate;
   the injection device further comprising:
   a brake mechanism provided on a side of the rotary shaft of the injection motor and configured to brake rotation of the rotary shaft;
   an injection motor connecting portion extending from the pusher plate in a direction substantially perpendicular to the axial direction; and
   an injection motor supporting portion connected to the injection motor connecting portion so as to be adjustable in position relative to the injection motor connecting portion, and configured to support the injection motor and the brake mechanism.

2. The injection device according to claim 1, wherein:
   the injection motor supporting portion comprises a plurality of members.

3. The injection device according to claim 1, wherein:
   the injection motor supporting portion has a box shape configured to accommodate the rotary shaft and the brake mechanism.

4. The injection device according to claim 1, wherein the brake mechanism comprises:
   a rotor portion non-rotatably connected to the rotary shaft; and
   a brake portion configured to brake rotation of the rotary shaft by sandwiching the rotor portion.

* * * * *